Jan. 6, 1931.  J. B. PAGIN  1,787,733
FISH LURE
Filed July 13, 1927
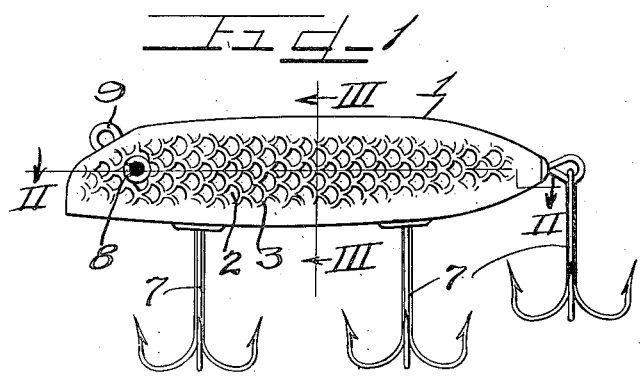
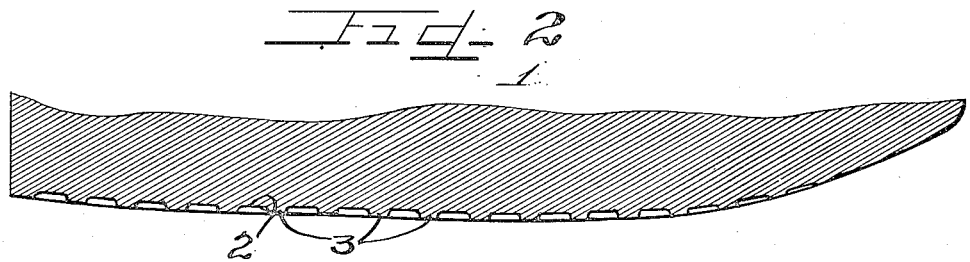
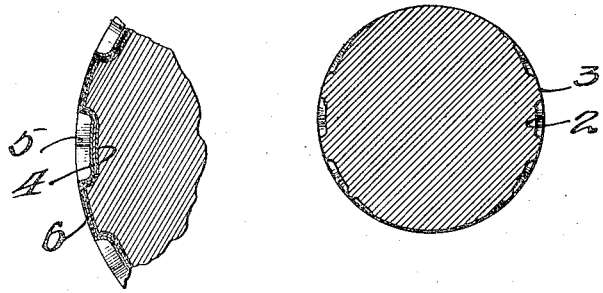

Patented Jan. 6, 1931

1,787,733

UNITED STATES PATENT OFFICE

JOHN B. PAGIN, OF SOUTH BEND, INDIANA, ASSIGNOR TO THE SOUTH BEND BAIT COMPANY, OF SOUTH BEND, INDIANA, A CORPORATION OF INDIANA

FISH LURE

Application filed July 13, 1927. Serial No. 205,312.

This invention relates to a fish lure.

In the attempt to make fish lures more closely resembling the live bait, many artful expedients have been used, such as outlining scale-like representations on the bait body by means of distinctive colors. Such a method is somewhat elaborate and expensive, as it necessitates using a stencil or some equivalent device for the application of the different coats of paint.

It is therefore an object of this invention to provide a fish lure having scale-like depressions formed in the surface of the lure and clearly defined by raised outlines, which, when the body is coated with a suitable paint, cause the imitation scales to stand out in relief, due to the reflection of the light from different angles.

Other and further important objects of this invention will become apparent from the disclosures in the following description and appended claim.

In the accompanying drawings which illustrate a preferred embodiment of this invention and in which similar reference numerals refer to similar features in the different views:

Figure 1 is a side elevational view of a fish lure embodying the principles of my invention.

Figure 2 is an enlarged fragmentary sectional view taken on line II—II of Figure 1.

Figure 3 is an enlarged sectional view taken on line III—III of Figure 1 with parts removed, showing the bait in partially finished condition.

Figure 4 is a fragmentary enlarged cross-sectional view of the finished bait.

As shown in the drawings:

The reference numeral 1 indicates a bait body of the type used in casting and trolling. In accordance with the method of manufacture described in my co-pending application, executed of even date herewith, Serial No. 205,744, filed July 14, 1927, the bait body 1 is provided with a series of depressions 2 and raised portions 3, to effect a similitude of the scales of a live fish. The bait body 1 being preferably formed of soft wood, the impressions representing the scales may be suitably formed by passing the bait body between rollers or dies having the required surface design.

After the scales have been formed upon the sides of the bait body 1, a base coat 4, of paint is applied over the entire body surface. There is next applied a coat 5 of distinctive color from the base coat, over the sides and back of the bait body 1 to represent the natural color of a live bait. The coat 5 may be applied in streaks or in any desired manner, and no attempt is made to protect either the depressed areas 2 or the raised portions 3 during the coating operation. Consequently, these areas receive similar applications of the paint and as an extremely thin coat is applied, each area receives approximately the same amount of paint. Consequently, the depressed areas 2 are not filled up to any substantial extent and still bear the same relation to the raised areas 3 as they did before the coat of paint was applied. A final coat 6 of a protective waterproof varnish or lacquer is last applied to the body surface. The various appendages, such as hooks 7, eyes 8 and line attaching eyelet 9 are then secured to the body 1 in the usual manner.

The great advantage which my fish bait has over baits heretofore known, is that the representation of scales on my fish lure is much more realistic and more attractive than in the case of known fish lures. The scales seem to stand out more strikingly when actually impressed into the surface of the bait body, due largely to the fact that the light is unevenly reflected from the raised portions 3 forming the outlines of the scales. Furthermore, when the bait is drawn rapidly through the water, as in reeling in or in trolling, the roughened surface of my bait causes ripples to be produced in the water which attract the attention of the fish to a greater extent than when smooth surfaced baits are used.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

An artificial fish bait consisting of a painted solid wooden body having fish scale-shaped portions therein comprising depressed portions bounded by ridges.

In testimony whereof I have hereunto subscribed my name at South Bend, St. Joseph County, Indiana.

JOHN B. PAGIN.